June 3, 1958      W. S. ANDERSON      2,837,064
LIQUID HEATER USING BURNED FUEL HEATING GASES
Filed May 11, 1954      2 Sheets-Sheet 1
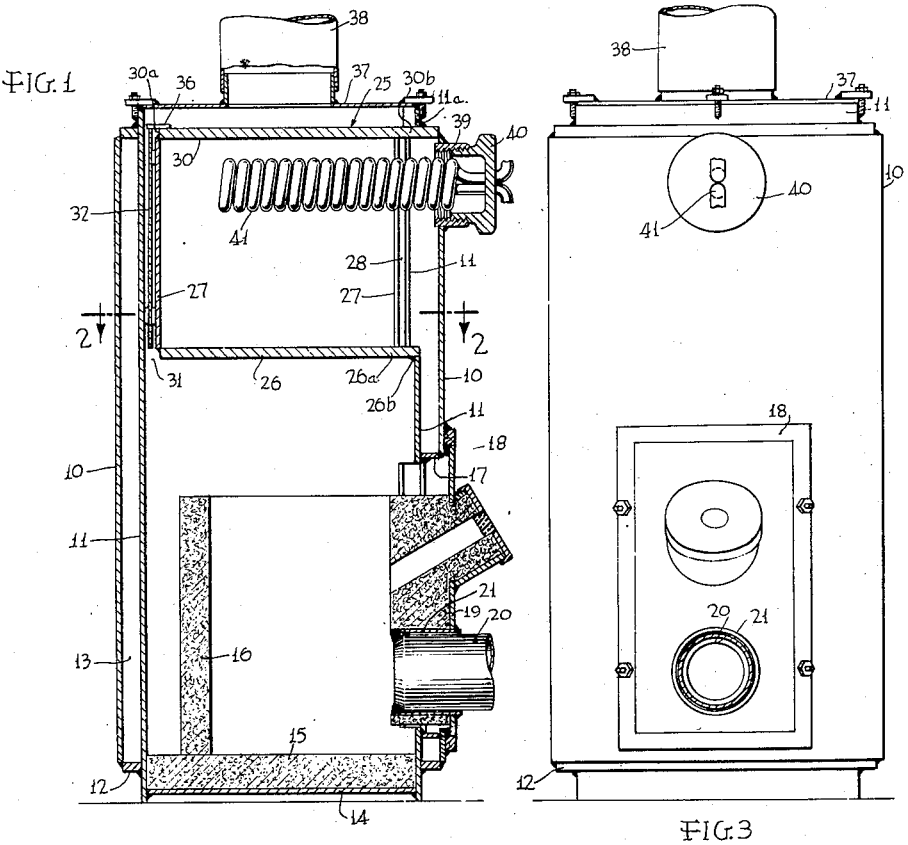
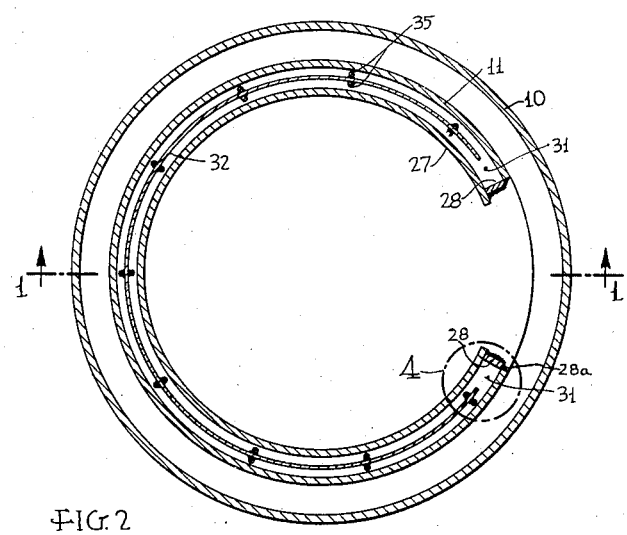
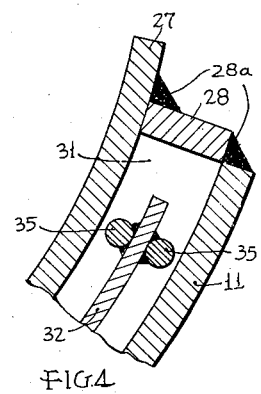
INVENTOR
William S. Anderson
BY
Wm. R. Glisson
ATTORNEY

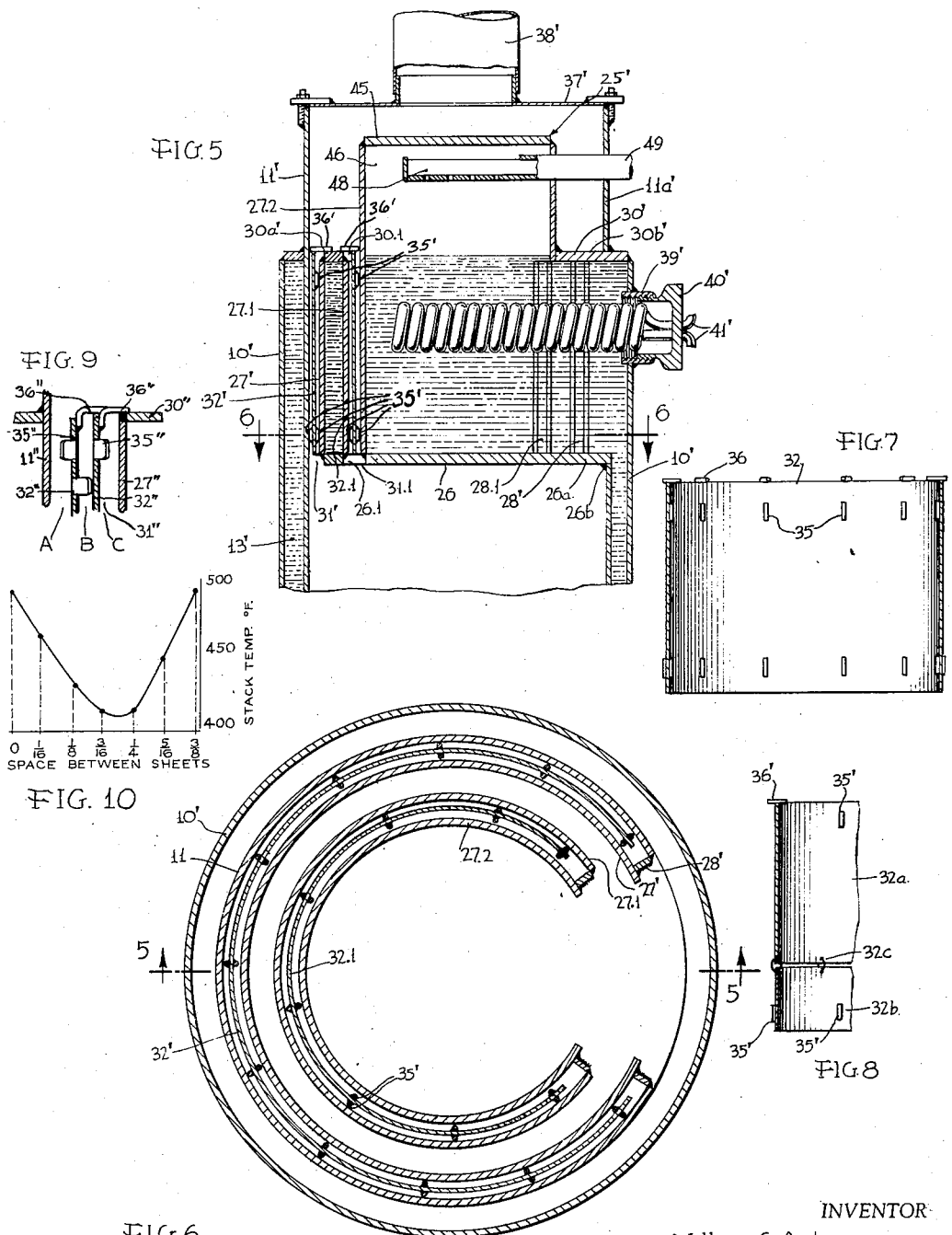

United States Patent Office 2,837,064
Patented June 3, 1958

2,837,064

LIQUID HEATER USING BURNED FUEL HEATING GASES

William S. Anderson, Williamsport, Pa., assignor of one-half to James E. Axeman, Williamsport, Pa.

Application May 11, 1954, Serial No. 429,069

9 Claims. (Cl. 122—165)

This invention relates to a liquid heater using burned fuel gases as the source of heat and has for an object the provision of improvements in this art.

One of the particular objects of the invention is to provide a hot gas liquid heater which will have very high efficiency so as to obtain the maximum heating effect in the liquid from a given quantity of fuel.

Another object is to provide very rapid heating of the liquid at the heat exchange surfaces and very rapid movement of the hot liquid from the heat exchange surfaces into the body of liquid to be heated.

Another object is to provide rapid movement of the gases through the passages or flues to avoid sooting and clogging of the passages and to minimize draft loss so as to induce rapid and efficient combustion of the fuel, but at the same time to extract the maximum possible heat from the gases and discharge them at the lowest practicable temperature.

Another object is to increase the heat transfer between the hot gases and the liquid contact surfaces by utilizing radiant heating effects from sheets heated convectively by the hot gases to aid the direct convection heating effects of the hot gases on the liquid backed surfaces.

Another object is to provide a convenient and effective arrangement for heating a separate liquid body by the gas-heated liquid body.

Another object is to provide a simple, convenient, easily constructed and easily repaired liquid heater.

The above and other objects and advantages of the invention will be apparent from the following description of certain exemplary embodiments, reference being made to the accompanying drawings, wherein:

Fig. 1 shows a fuel burning liquid heater or boiler embodying the invention, the view being taken as a central vertical section on the line 1—1 of Fig. 2;

Fig. 2 is an enlarged horizontal section taken on the line 2—2 of Fig. 1;

Fig. 3 is a front view of the heater;

Fig. 4 is an enlarged partial section in the circle 4 of Fig. 2;

Fig. 5 is a vertical section like Fig. 1 but showing a plural flue heater for producing steam;

Fig. 6 is an enlarged horizontal section taken on the line 6—6 of Fig. 5;

Fig. 7 is a vertical section through a flue divider sheet showing supporting and spacing means;

Fig. 8 is a vertical section showing a modified form of flue divider sheet.

Fig. 9 is a partial vertical section showing another form of flue dividing sheet means; and Fig. 10 is a diagram showing performance characteristics of different spacings of the sheets shown in Fig. 9.

As shown in the first embodiment of Fig. 1 to 4, the liquid heater comprises an outer shell 10 and an inner shell 11 connected at the bottom by a ring 12, sometimes referred to as the mud ring. There are clean-out openings and pipe connections at the bottom and elsewhere, but these are omitted for simplicity. The space between the shells 10 and 11, generally indicated by the numeral 13, is filled with liquid, commonly water for all normal purposes. The present heater, in small sizes, at least, is principally intended for home heating purposes, and such units use water and are referred to as boilers. The lower end of the inner shell 11 is closed by a bottom plate 14, which is covered by a refractory floor 15 forming the bottom of a fire box having sides 16 made of refractory material.

A door opening, preferably rectangular, is formed in the shells 10 and 11 and the space between shells around the door opening is closed by a frame 17. An outer frame 18 is secured to the outer shell 10, as by bolts and nuts, and a plate 19 is secured, as by welding, to the outer frame 18. The door unit thus formed and secured by the bolts is held upon a suitable heat-resistant gasket at the joint to provide a good seal and ready access when desired. As shown, an oil burner tube 20 is disposed in a short fixed tube 21 which is welded in an opening formed in the plate 19. A sight glass tube is provided in the door.

At the top the inner shell 11 extends above the outer shell and connecting closing ring element and is cut out from the upper edge on one side in rectangular shape to permit a flue assembly or unit, which is generally indicated by the numeral 25, to be slipped downward into position. The flue assembly comprises a lower horizontal plate or head 26 which for most of its circumference is spaced interiorly from the inner shell 11 and which at the front has a projection 26a, which, when the unit is inserted, is welded at 26b to the lower edge of the cut-out opening of the shell 11. To the arcuate portion of the plate 26 there is secured a C-shaped shell sheet 27. At each end of the shell sheet 27 there is secured a vertical closing strip 28 which, after the unit is inserted, is welded at 28a to the vertical sides of the opening in the inner shell 11. The strips 28 at the lower end are welded to the plate 26 before the flue assembly is brought into position.

The flue assembly also includes a horizontal top plate or head 30 which has a C-shaped arcuate cut-out portion or opening 30a which exteriorly surrounds the upper end of the inner shell 11 and interiorly fits the upper edge of the shell sheet 27. The outer portion of the head 30 forms the top closing ring between the outer and inner shells. The shell sheet 27 and the upper end of the strips 28 are welded to the top plate 30 before the flue assembly is brought into position. After the flue assembly or unit is brought into position the top plate 30 is welded to the outer shell 10 and the inner shell 11. The top plate 30 has a front projection 30b which extends through the openings in the shells 10 and 11 and is welded to these shells.

The flue unit goes into the opening in the inner shell unit to the extent that the top plate 30 is located below the upper end of the opening. The space above the top plate in the opening is closed by a curved strip 11a which at its bottom edge is welded to the top plate and at its ends to the shell 11.

In the C-shaped flue 31 formed between the shell 11 and the shell sheet 27 there is placed a divider sheet 32 which may be characterized as an "economizer" sheet. This sheet, when heated convectively by the flue gases, becomes much hotter than the walls of the flue, which are kept cooler by the water behind them, and radiates heat to these walls to supplement the heat conveyed to them directly through convection by the passing flue gases. The sheet 32 is held in proper position by spacers 35, here shown as short bar members, welded at spaced points to the sheet. It is supported by short transverse bar members 36 welded to the top edge and resting on the top of the plate 30 at spaced points. The outer ends of the members 36 engage the inner side of the shell 11 to act as spacers to keep the sheet 32 centered.

The top of the shell 11 is covered by a horizontal cover plate 37 tightly secured upon gaskets to the shell, as by bolts. At the center of the cover plate there is provided an exhaust gas or smoke pipe 38. The space between the cover plate 37 and the top plate 30 forms a smoke box.

The outer shell 10, near the top and between the ends of the closed C-shaped ends of the flue 31, is provided with a large opening within which there is welded a short tubular fitting 39. The fitting 39 is threaded interiorly and into it is screwed a cap 40 carrying a water coil 41 for a secondary hot water supply such as for household use. The coil extends into the large primary body of water contained within the flue unit and connected with the body of water between the shells 10 and 11 through the wide deep opening between the ends of the C-shaped flue. The opening in the shell 10 for the fitting 39 is large enough to allow a welder to work through in making the necessary connecting welds in case it is desired to assemble the shell 10 with the shell 11 before the flue unit is brought into position.

The embodiment shown in Figs. 5 and 6 is similar in most of its parts to the first embodiment and insofar as parts are similar they will be designated by the same reference character with a prime (') added.

There is an outer shell 10', an inner shell 11' and a flue assembly unit 25', but instead of one C-shaped flue, as in the first form, there are two flues in the second form. The lower plate 26', in addition to the cut-out portion in which the shell sheet 27' and closing strips 28' are welded, is provided with an arcuate C-shaped opening 26.1 to the sides of which are welded C-shaped shell sheets 27.1 and 27.2. The ends of the shell sheets 27.1 and 27.2 are closed by end strips 28.1 to define an inner C-shaped flue 31.1. The upper plate 30', in addition to the flue opening 30a', is provided above the opening 26.1 with a C-shaped opening 30.1, to the sides of which the shell sheets 27.1 and 27.2 are welded.

The inner shell sheet 27.2 is elongated above the water level and enclosed by a cap 45 to form a steam dome 46, the center portion of the upper plate 30' being cut out within the shell sheet 27.2. The shell 11' is also extended upward above the level of the steam dome 46 and the filler 11a' welded in to form a smoke box above the gas flues 31' and 31.1, the top of the shell 11' being enclosed by a cover plate 37' surmounted by a smoke pipe 38'. If height above the heater is small the smoke pipe may leave horizontally from the side of the smoke box at the top.

In the top of the steam dome above the water level there is provided a steam header pipe 48 having a large opening in the top for leading steam to an offtake pipe 49 and small drip openings in the bottom.

A water heating coil 41' is carried by a cap 40' screwed into a stub pipe 39' secured in the shell 10'.

Divider sheets 32' and 32.1 are disposed in the flues 31' and 31.1 to pick up additional heat by convection from the hot gases and to transmit this heat by radiation to the water-backed surfaces to add to the heating effects imparted by direct convection to these surfaces. Spacers 35' and top supporting and spacing bars 36' are provided as before. Spacers could also be formed by welding on thin bent metal clips or by striking out tabs from the divider sheet itself.

Fig. 7 shows one of the flue divider sheets 32 removed from the flue. The spacers 35 are needed only on the inside at the top when the top bars 36 form spacers at one end. In Fig. 5 the bars 36' form spacers at their outer ends in flue 31' and the bars 36' at the inner flue 31.1 form spacers at their inner ends. When the top bars do not form spacers at the top, the spacers 35' may be placed on one or both sides, as needed. The spacers on opposite sides of the sheet may be circumferentially staggered if desired to utilize spring in the sheet and avoid wedging in the flue if it should be irregular in thickness.

The divider sheets may be made of any metal which will withstand the heat. Black iron is good because it will absorb heat and produce good radiant heating effects. Stainless steel is another suitable material, and is especially suitable if the flue temperatures are high. In Fig. 8 there is shown a divider which is made of two parts, an upper part 32a of a metal such as black iron and a lower part 32b of stainless steel or other metal which will withstand the higher temperatures prevailing at the lower end of the flue adjacent the fire box. The parts may be held together by loops 32c which incidentally may act as spacers.

Fig. 9 shows an arrangement in which the space in the C-shaped flue 31'' is divided by a plurality of divider sheets 32''. This form employs a plurality of divider sheets on the principle that as long as one side of a divider sheet faces a liquid-backed heat exchange wall there will be good transfer of heat by convection. It has been found that this arrangement extracts further heat from the gases without materially increasing the draft loss. This particular arrangement was used for experimental purposes to determine the optimum spacing between sheets for maximum heating effects. The supporting bars 36'' are made for convenient shifting of the sheets and the struck-out tabs 35'' represent spacers which can be readily bent to hold the sheets at different distances apart. The spaces are designated as A, B and C. Using a boiler having a flue about 13 inches long vertically and 1 inch thick and spacers $\frac{1}{16}$ inch thick and varying the spacing B between the two sheets from zero upward, keeping the outside spaces A and C equal, and keeping the draft loss substantially constant, the performance curve of Fig. 10 was produced, plotting smoke pipe temperatures against spacing between sheets. This diagram shows that the lowest temperatures were obtained when the sheets were spaced from each other (the space B) by a distance slightly less than the distance between sheets and the adjacent water-backed surfaces (the spaces A and C). Specifically, the optimum performance was attained when the space B was between $\frac{3}{16}$ inch and $\frac{1}{4}$ inch and the spaces A and C correspondingly between $\frac{11}{32}$ inch and $\frac{5}{16}$ inch.

The flues are substantially unobstructed throughout their length, the spacers and support bars taking up negligible space, hence the gases move rapidly and smoothly up the flue and have practically no opportunity to deposit soot or scale. The passages are very thin, hence almost all of the body of the gases is forced to wipe the metal surfaces to give up heat rapidly while still moving at high speed. The flue is relatively wide and short, thus aiding in the rapid flow of gases. As a further aid, the smoke pipe is located above the flue so that there are no dead pockets or other obstructions to interfere with smooth, rapid gas movement.

The flue is made as thin as possible, taking into account the total amount of heat which must be transferred and the necessary speed of gas flow required to keep the flue clean. As an example, but not as a limitation, one heater had a flue 13 inches long, 44 inches wide and $1\frac{1}{16}$ inch thick. A dividing sheet $\frac{1}{8}$ inch thick had spacers $\frac{7}{32}$ inch thick on each side, leaving spaces about $\frac{11}{16}$ inch thick along the heat transfer walls.

In case it should be necessary to clean the flue at times this shape of flue makes cleaning very easy. Small tubes which would furnish comparable heat transfer characteristics are almost impossible to clean thoroughly. And large tubes, though easier to clean than small tubes, do not provide the same efficient heat transfer within a short length as small tubes. The present construction provides the efficient heat transfer of small tubes with the easy cleaning characteristics of large tubes, but with improvements on both.

The welds of the present assembly are all disposed for maximum accessibility for erection or repair. In particular, it is to be noted that the end strips 28 are welded to the outer surface of the flue sheet 27 and are welded along their outer edges to the edges of the opening in the shell 11, thus making access from the front opening of the shell 10 very easy. If desired, the opening in shell 10 where the tube 39 is located can be made larger than shown for a larger tube or may include a large opening closed by a cover plate like plate 19 for the fire box which may be removed when it is desired to gain access to the interior.

The boiler shown is intended for moderately low pressure of domestic use and works well without strengthening stays, but for higher pressures it is very easy to provide stays where needed to provide the needed extra strength.

It will be understood that each of the sheets of Fig. 9 may be made like the Fig. 8 form if heat conditions make the two-part construction desirable. But it is to be noted that plural divider sheets provide such effective heat transfer that in some cases they may be made shorter than the flue so that their lower ends stand fairly clear of the hottest gases in the fire box and in this case it may not be necessary to use the high heat resistant piece at the bottom end.

It is thus seen that the invention provides a simple, inexpensive and economical heater which is very easy to build and repair.

While certain embodiments have been described by way of example, it is to be understood that there may be other embodiments within the scope of the invention.

What is claimed is:

1. A liquid heater in which the liquid is heated by burned fuel gases, comprising in combination, outer and inner shells forming an annular outer liquid space between them, a fire box within the lower part of the inner shell and largely surrounded by liquid space formed between said shells, a C-shaped shell sheet disposed above the fire box and spaced inwardly from the inner shell and with it forming a thin wide C-shaped flue above the fire box, the inner shell being formed with a cut out gap matching the side opening or gap in the C-shaped shell sheet, upper and lower header plates secured to the ends of the C-shaped shell sheet and across the upper and lower ends of the matching gap openings in the shell sheet and the inner shell, and vertical flue gap end strips secured between the spaced edges of the gap openings in the shell sheet and inner shell to form with the shell sheet an enclosure for an inner liquid space having a wide connecting passage with the outer liquid space, leaving the flue open, the connecting passage being of the full height of the inner liquid space, the header plates closing off the passage of gases from the fire box except through said flue, a smoke box located directly above the upper end of the flue, the flue being relatively short as compared to the length of the outer liquid space, the flue also being very wide and very thin transversely to the direction of gas flow therethrough and being clearly open and substantially free from transverse baffling obstructions throughout its full length from the fire box to the smoke box to provide for free even flow of hot gases therethrough, a thin C-shaped divider sheet disposed in said flue between said inner shell and said shell sheet to divide the thin flue space into thinner spaces which are clearly open and substantially free from baffling obstructions to provide for free even flow of hot gases therethrough, the thin divider sheet presenting at least one of its two broad outer surfaces toward one of said liquid-backed surfaces formed by the inner shell and the shell sheet, means holding said divider sheet in position in the flue but leaving it sufficiently free from engagement with the liquid-backed surfaces so that by convection heat transfer from hot gases it can attain a temperature much higher than that of the liquid-backed surfaces to transfer heat to them by radiation but with little transfer by conduction, the means holding said divider sheet in position including top supports and side spacers disposed at spaced points throughout the surface of the divider sheet on both sides, said spacers having small contact surfaces presented on the sides away from said sheet to minimize transfer of heat by conduction, the arcuate shape of the divider sheet, the relatively uniform temperature over its surface extent produced by having liquid-backed heat absorptive surfaces, and the side spacers for the divider sheet, together with the rapid and uniform passage of hot gases thereover, serving to keep the divider sheet in proper position and free from buckling or warping.

2. A liquid heater in which the liquid is heated by burned fuel gases, comprising in combination, spaced outer and inner shells forming between them an outer annular liquid space for a main body of liquid, a fire box in the lower portion of the inner shell and largely surrounded by liquid space, a smoke box in the upper portion of the heater above the fire box, at least one C-shaped inner shell sheet disposed above the fire box and within the inner shell, the inner shell being formed with a cut out gap matching the side opening or gap in the C-shaped shell sheet, lower and upper header plates secured to the ends of the C-shaped shell sheet and across the upper and lower ends of the matching gap openings in the shell sheet and the inner shell, and vertical flue gap end strips secured between the spaced edges of the gap openings in the shell sheet and inner shell to form with the shell sheet an enclosure for an inner liquid space separated by at least one C-shaped open gas flue from the outer annular liquid space and connected by a radial passage with said outer annular liquid space, a heat exchange coil in said inner liquid space, said inner shell extending above the outer shell and inner shell sheet, a cap on the upper end of the inner shell forming part of the smoke box, said inner shell sheet extending above the upper header plate, a cap on the upper end of the inner shell sheet to form a steam dome above the inner liquid space, and a steam pipe leading from said steam dome to the outside of the heater.

3. The combination as set forth in claim 2, further characterized by the fact that said inner shell is cut out from the top and side to form a side recess, the upper header plate having a radial extension fitting in said recess and extending to the outer shell, and a filler strip secured in said inner shell recess above said radial extension of the upper header.

4. A liquid heater in which the liquid is heated by burned fuel gases, comprising in combination, outer and inner walls forming an outer liquid space between them, a fire box in the lower part of the heater within the inner wall, the inner wall having an opening in one side, means including an interior wall, spaced header plates and closing strips at said opening forming an inner liquid space connected at said opening with said outer liquid space and leaving a relatively very wide and very thin arcuate flue extending between the header plates, the flue being clearly open from end to end without baffles or other substantial obstruction to the free even flow of hot gases therethrough, the walls defining the sides of said flue providing liquid-backed heat exchange surfaces for transferring heat from the hot gases to the liquid, and a thin arcuate divider sheet in said flue disposed parallel to the width of said heat exchange surfaces to form thinner gas passages which are clearly open from end to end without baffles or other substantial obstruction to the free even flow of gases therethrough, means holding said divider sheet in position in said flue, the divider sheet being sufficiently free from contact with said liquid-backed surfaces so as to be heated by the hot gases to a temperature much higher than that of the liquid-backed surfaces, said divider sheet absorbing heat by convection from the hot gases and transferring heat by radiation to the broad liquid-backed heat exchange surfaces to supplement the heat imparted directly thereto by convection by the hot gases, the means holding said divider sheet in position including top supports and side spacers disposed at spaced points throughout the surface of the divider sheet on both sides, said spacers having small contact surfaces presented on the sides away from said sheet to minimize transfer of heat by conduction, the arcuate shape of the divider sheet, the relatively uniform temperature over its surface extent produced by having liquid-backed heat absorptive surfaces, and the side spacers for the divider sheet, together with the rapid and uniform passage of hot gases thereover, serving to keep the divider sheet in proper position and free from buckling or warping.

5. A liquid heater in which the liquid is heated by burned fuel gases, comprising in combination, a shell having a fire box and a smoke box spaced therefrom with an enclosed liquid heating space therebetween, spaced header plates and connecting heat exchange walls between the header plates in said liquid heating space defining at least one arcuate gas flue extending from the fire box to the smoke box, said gas flue being relatively very wide and very thin in a direction transverse to the direction of gas flow therethrough, the thin flue thus defined being freely open without baffles or other substantial transverse obstructions to the free flow of hot gases therethrough, a thin arcuate longitudinal metal divider sheet disposed in said flue dividing the thin dimension into thinner spaces but leaving the spaces substantially free from transverse obstruction to the free even flow of gases therethrough, and means holding said divider sheet in position in said flue, but leaving the sheet sufficiently free from contact with the surfaces of said flue so as to be heated to a temperature much higher than that of the flue surfaces, the surfaces of said divider sheet being disposed parallel to the wide surfaces of said liquid-backed heat exchange walls so as to take up heat from the hot gases by convection and to transfer the heat to the heat exchange walls by radiation to add to the heat imparted directly by convection to the heat exchange walls by the hot gases, the means holding said divider sheet in position including top supports and side spacers disposed at spaced points throughout the surface of the divider sheet on both sides, said spacers having small contact surfaces presented on the sides away from said sheet to minimize transfer of heat by conduction, the arcuate shape of the divider sheet, the relatively uniform temperature over its surface extent produced by having liquid-backed heat absorptive surfaces, and the side spacers for the divider sheet, together with the rapid and uniform passage of hot gases thereover, serving to keep the divider sheet in proper position and free from buckling or warping.

6. A liquid heater as set forth in claim 5, further characterized by the fact that the header plates and heat exchange walls between said spaced header plates form a plurality of wide thin parallel arcuate flues through said liquid heating space through which the hot gases from the common fire box flow in parallel, and that there is a thin divider sheet in each of said flues.

7. A liquid heater as set forth in claim 5, in which two parallel divider sheets are disposed in a gas flue, the divider sheets being spaced from each other and from the heat exchange walls by the side spacers and each presenting one radiating surface toward a heat exchange wall.

8. A liquid heater as set forth in claim 7, in which the spacing between divider sheets is less than the spacing between the divider sheets and the heat exchange walls.

9. A liquid heater as set forth in claim 5, in which said divider sheet has its lower end located above the level of the lower header plate to stand clear of the fire box to avoid damage by direct exposure to the source of hot gases in the fire box.

References Cited in the file of this patent

UNITED STATES PATENTS

| | | |
|---|---|---|
| 797,960 | Junkers | Aug. 22, 1905 |
| 931,907 | Wegener | Aug. 24, 1909 |
| 1,417,888 | Dearing | May 30, 1922 |
| 1,895,966 | Bluemel | Jan. 31, 1933 |
| 2,633,106 | Boarman | Mar. 31, 1953 |

FOREIGN PATENTS

| | | |
|---|---|---|
| 6,104 | Denmark | Oct. 28, 1903 |
| 167,436 | Switzerland | May 16, 1934 |